United States Patent [19]
Dinges

[11] Patent Number: 5,378,449
[45] Date of Patent: Jan. 3, 1995

[54] FORMATION OF BASIC HYDROGEN PEROXIDE

[75] Inventor: Warren L. Dinges, Norman, Okla.

[73] Assignee: The United States of America as represented by the Secretary of the Air Force, Washington, D.C.

[21] Appl. No.: 115,364

[22] Filed: Aug. 31, 1993

[51] Int. Cl.$^6$ .............. C01B 13/00; C01B 15/01; H01S 3/095
[52] U.S. Cl. .............................. 423/579; 372/89; 423/584; 423/586
[58] Field of Search .............. 423/586, 584, 579; 372/89

[56] References Cited

U.S. PATENT DOCUMENTS

| | | | |
|---|---|---|---|
| 1,271,611 | 7/1918 | Pickl | 423/586 |
| 1,627,325 | 5/1927 | Halvorsen | 423/586 |
| 3,317,280 | 5/1967 | Long et al. | 423/586 |
| 4,246,252 | 1/1981 | McDermott et al. | 423/579 |
| 4,267,526 | 5/1981 | McDermott et al. | 331/94.5 G |
| 4,310,502 | 1/1982 | Wagner | 423/579 |
| 4,318,895 | 3/1982 | Richardson et al. | 423/579 |
| 4,342,116 | 7/1982 | MacKnight et al. | 372/89 |
| 4,418,413 | 11/1983 | Hon | 372/89 |
| 4,461,756 | 7/1984 | Rockenfeller | 423/579 |
| 4,558,451 | 12/1985 | McDermott et al. | 372/89 |
| 4,643,889 | 2/1987 | Uchiyama et al. | 423/579 |
| 4,653,062 | 3/1987 | Davis et al. | 372/89 |
| 4,668,498 | 5/1987 | Davis | 423/579 |
| 4,787,091 | 11/1988 | Wagner | 372/89 |
| 4,866,729 | 9/1989 | Verdier et al. | 372/89 |
| 4,961,200 | 10/1990 | Verdier et al. | 372/89 |
| 5,299,100 | 7/1993 | Harpole | 423/579 |

*Primary Examiner*—Wayne Langel
*Attorney, Agent, or Firm*—Jacob N. Erlich; Stanton E. Collier; Thomas C. Stover

[57] ABSTRACT

Potassium superoxide can be used to generate and regenerate Basic Hydrogen Peroxide, the primary fuel for Chemical Oxygen-Iodine Lasers. The solid reacts with depleted BHP/$H_2O_2$ solution consuming one equivalent of hydrogen peroxide and producing two equivalents of hydroperoxide, reversing the chlorine/BHP reaction that evolves singlet delta oxygen, the energetic species in the COIL system. This same regeneration reaction can be used to generate new BHP solutions by reaction of potassium superoxide with dilute hydrogen peroxide or a protic mineral acid such as hydrochloric acid. These reactions of potassium superoxide provide new and useful methods of generating and regenerating BHP, that significantly decrease COIL system weights and environmental impact.

10 Claims, No Drawings

FORMATION OF BASIC HYDROGEN PEROXIDE

STATEMENT OF GOVERNMENT INTEREST

The invention described herein may be manufactured and used by or for the Government for governmental purposes without the payment of any royalty thereon.

BACKGROUND OF THE INVENTION

1. Field of the Invention

This invention relates to methods for preparation of basic hydrogen peroxide (BHP) including the generation and regeneration thereof in a chemical system that saves weight and lessens environmental impact.

2. The Prior Art

Basic hydrogen peroxide (BHP), is the principle fuel for Chemical Oxygen-Iodine Lasers (COIL). A COIL laser is a chemically pumped gas dynamic electronic transition laser. COIL systems show marked potential for both military and industrial application due to inherent system benefits. Chemical laser devices have a much greater degree of scalability to higher power regions than photolytic and solid state devices which can be adversely affected by the increased thermal loading. Chemical lasers have higher efficiencies (20–30%), particularly at applicable and useful power levels. The COIL wavelength at 1.315 μm is also ideally suited for industrial applications. It has outstanding fiber optic transmission qualities, and it couples well with metals allowing for the use of lower power devices without sacrificing welding/cutting effectiveness. The final, and possibly most important benefit of COIL is the excellent beam quality. Gas dynamic lasers are known to have very good beam quality, but COIL is even unique among this class of devices. COIL operates on an electronic transition producing an inherently higher quality beam, as opposed to a vibrational (CO/CO$_2$) or rotational transition (HF/DF) lasers. This significantly higher beam quality gives cleaner cuts and welds, along with simpler beam splitting and direction.

The chemical pump for COIL systems is the electronically excited, singlet delta state of molecular oxygen (O$_2^1\Delta$). A chemical reaction between chlorine and Basic Hydrogen Peroxide produces the O$_2^1\Delta$. This metastable state of excited oxygen then collisionally transfers its energy to iodine, the actual lasing species of COIL.

The fundamental source of O$_2^1\Delta$ and hence the output laser power is the BHP fuel and its reactive species. This unique and rather unstable solution of aqueous, alkaline hydrogen peroxide is generated in the prior art, by reacting aqueous metal hydroxides (usually potassium hydroxide) with an excess of hydrogen peroxide. The primary reactive species in BHP is the hydroperoxide ion, O$_2$H$^-$, which is normally generated according to the following equation:

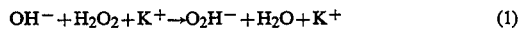

(1)

The BHP reacts with chlorine gas in the singlet oxygen generator to evolve the excited oxygen as follows:

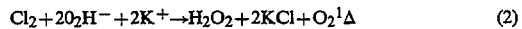

(2)

BHP is said to be depleted, and hence disposed of when the hydroperoxide ion concentration falls below levels sufficient to maintain lasing. Currently, this means that only 10 weight percent of the fuel is utilized by the device, and the rest is wasted in addition to requiring an environmentally critical neutralization prior to disposal.

That is, considerable chemical waste streams are produced by the above prior art procedure of reaction (2). Also additional reactants must be employed and reaction (2) repeated, so that reactants and previously spent reactants add considerable weight to the COIL system. Also there are the considerable hazards of Hydrogen Peroxide transportation and handling to replace the above quickly depleted BHP fuel.

An example of the above prior art procedure is given in U.S. Pat. No. 5,229,100 to G. M. Harpole (1993).

Accordingly there is need and market for an improved BHP generation process that significantly overcomes the above prior art shortcomings.

There has now been discovered an improved method for preparation of BHP with marketly reduced waste of reactants and that significantly decrease COIL system weights and environmental impacts.

SUMMARY OF THE INVENTION

Broadly the present invention provides a method for generating and regenerating Basic Hydrogen Peroxide (BHP, the primary fuel for Chemical Oxygen-Iodine Lasers, (COIL) by reacting KO$_2$ with an acid selected from the group consisting of H$_2$O$_2$ and a protic acid.

Thus the above reaction can be carried out according to:

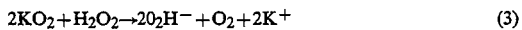

(3)

Alternatively the above reaction can be carried out according to

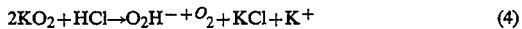

(4)

DESCRIPTION OF PREFERRED EMBODIMENTS

Referring to the invention in more detail, the above reactions (eq.) (3) and (4) thus generate BHP for use in eq. (2) above so as to evolve the singlet delta oxygen of eq. (2) used in COIL lasing. Such reactions are preferably conducted at 0° to −10° C. and the BHP product desirably stored at about −20° C. for stability purposes.

Now when the BHP of eq. (2) is depleted, KO$_2$ can be added to the BHP/H$_2$O$_2$ solution to react with the H$_2$O$_2$ of eq. (2) to regenerate BHP per eq. (3) hereof, within the scope of the invention.

The method of the invention thus employs potassium superoxide (KO$_2$), a canary yellow solid available either in powder or chunk form from a US manufacturer, which is employed in, e.g. two ways per the invention:

a) The KO$_2$ solid is reacted with dilute H$_2$O$_2$ (e.g. 10 to 30 wt. % and preferably 15 to 20 wt. % H$_2$O$_2$ in H$_2$O) in the (depleted) BHP solution per eq. (2) and (3) as discussed above. The KO$_2$ thus consumes one equivalent of hydrogen peroxide and produces 2 equivalents of hydroperoxide ion (BHP), thus reversing the chlorine/BHP reaction (2) that evolves singlet delta oxygen, the energetic species in the COIL system.

That is, as indicated above, reaction (3) of the invention reverses the chemical process of the chlorine/BHP reaction (2) above, with respect to the O$_2$H$^-$(BHP) and H$_2$O$_2$ components. The liberation of oxygen in reaction (3) above, also prevents any degree of reversibility, ensuring the completeness of the reaction. Hence, the $KO_2/H_2O_2$ reaction can be used to regenerate BHP that has been depleted through normal COIL operation. For a complete regeneration process, however, the Potassium Chloride salt, KCl must be physically removed from the BHP solution.

b) The above regeneration reaction can also be used to generate new BHP solutions by reaction of $KO_2$ with a protic mineral acid such as hydrochloric acid as indicated above in reaction (4).

According to the invention one can employ various protic acids in reaction (4) such as $H_2SO_4$, $HNO_3$ and $H_3PO_4$. However HCl is a preferred protic acid because a major reaction by-product KCl, is already present in COIL systems, reaction (2) and such acid is currently used in the waste neutralization process and thus is already a current COIL system fuel.

Accordingly the above reactions (3) and (4) of the invention provide new and useful methods of generating and regenerating BHP that significantly decrease COIL system weights and environmental impact.

The invention thus provides two successful reactions to generate BHP using $KO_2$ and other common COIL reactants. One method is a) the reacting of $KO_2$ with, e.g. dilute $H_2O_2$, a weak acid and the other method b) provides for reaction of $KO_2$ with a protic mineral acid.

Thus the BHP generation and regeneration methods of the invention are believed highly advantageous from an industrial perspective. That is, the method of the invention provides for preparation of BHP with markedly reduced waste of reactants, significantly decreased COIL system weights and reduced environmental impact.

This invention now closes the loop on the COIL BHP chemistry cycle, drastically increasing the potential applications of COIL in the military and industrial sectors. Chemical waste streams are reduced by 90 percent to only the by-product, potassium chloride salt (still wet with BHP). The significant hazards of hydrogen peroxide transportation and handling can be eliminated. The entire BHP system now would decrease significantly in weight by allowing for the complete consumption of the fuel's reactive potential.

The below diagram can summarize some of the BHP generation and regeneration equations within the scope of the invention:

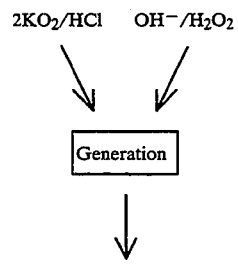

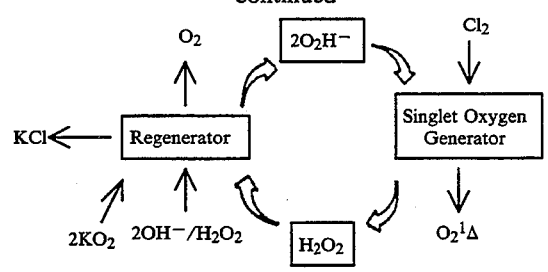

The primary alternative for the generation of BHP is the standard potassium hydroxide and hydrogen peroxide mixing reaction shown in eq. (1). This older generation method is significantly less expensive than these new proposed methods, but it would require additional chemical sources if the potassium superoxide regeneration method be used.

The only alternative regeneration method (to those of the invention) involves the direct addition of solid potassium hydroxide and hydrogen peroxide in a two to one stoichiometric ratio. The chemical reaction is the same as in eq. (1). The primary benefit of this alternative method is a lower cost, but the method still requires the handling of hydrogen peroxide and weighs more. In addition to having another significant limitation. The method causes a progressive increase in the BHP volume, eventually requiring a system drain-off and waste.

Thus per the method of the invention, potassium superoxide can be used to generate and regenerate BHP, the primary fuel for COIL systems. The same regeneration reaction can be used to generate new BHP solutions by reaction of $KO_2$ with dilute $H_2O_2$ or with a protic mineral acid, e.g. HCl As noted above, these reactions of $KO_2$ provide new and useful methods of generating and regenerating BHP, that significantly decrease COIL system weights and environmental impact.

What is claimed is:

1. A method for generating basic hydrogen peroxide (BHP) by reacting potassium superoxide with an acid selected from the group consisting of hydrogen peroxide and a protic acid.

2. The method of claim 1 for generating BHP comprising reacting $KO_2$ with dilute $H_2O_2$.

3. The method of claim 1 wherein said protic acid is selected from the group consisting of HCl, $H_2SO_4$, $HNO_3$ and $H_3PO_4$.

4. The method of claim 3 wherein BHP is reacted with chlorine gas as follows:

$$Cl_2 + 2O_2H^- + 2K^{30} \rightarrow H_2O_2 + 2KCl + O_2{}^1\Delta$$

to yield a depleted $BHP/H_2O_2$ solution and $KO_2$ is reacted with $H_2O_2$ in said depleted $BHP/H_2O_2$ solution to produce two equivalents of hydroperoxide or BHP, for every equivalent of $H_2O_2$ consumed.

5. The method of claim 1 for generating BHP by reacting $KO_2$ with a protic mineral acid according to:

$$2KO_2 + HCl \rightarrow O_2H^- + O_2 + KCl + K^+$$

6. The method of claim 1 conducted at between 0° to $-10°$ C.

7. A method for generating or regenerating basic hydrogen peroxide (BHP) by reacting potassium superoxide with hydrogen peroxide.

8. A method of claim 7 according to:

$$2KO_2 + H_2O_2 \rightarrow 2O_2H^- + O_2 + 2K^+$$

9. The method of claim 8 wherein 7 moles of $KO_2$ plus 3.5 moles of $H_2O_2$ yield 7 moles of $O_2H^-$.

10. The method of claim 7 conducted at between 0° to $-10°$ C.

* * * * *